(12) United States Patent  (10) Patent No.: US 6,550,742 B1
Wahl                      (45) Date of Patent:     Apr. 22, 2003

(54) THERMAL COOLED VACUUM FORM

(76) Inventor: David M. Wahl, 260 Manor Rd., Bloomfield Hills, MI (US) 48304

( * ) Notice: Subject to any disclaimer, the term of this patent is extended or adjusted under 35 U.S.C. 154(b) by 0 days.

(21) Appl. No.: 09/580,049

(22) Filed: May 27, 2000

Related U.S. Application Data

(62) Division of application No. 09/211,957, filed on Dec. 15, 1999.

(51) Int. Cl.$^7$ .......................... B29C 51/10; B29C 51/42
(52) U.S. Cl. ...................... 249/80; 249/134; 425/405.1; 425/388; 425/384
(58) Field of Search ............................. 249/79, 80, 134; 425/388, 405.1, 384; 264/220, 225, 226

(56) References Cited

U.S. PATENT DOCUMENTS

| | | | |
|---|---|---|---|
| 3,183,289 A | | 5/1965 | Leavesley, Jr. |
| 3,249,672 A | | 5/1966 | Richards et al. |
| 3,253,069 A | | 5/1966 | Holley et al. |
| 3,617,369 A | * | 11/1971 | Lombardo .................. 249/113 |
| 3,638,299 A | | 2/1972 | Garner et al. ............... 29/527.2 |
| 4,125,351 A | * | 11/1978 | Alfter et al. ................ 249/134 |
| 4,160,003 A | | 7/1979 | Kozuka et al. ............... 264/87 |
| 4,350,486 A | * | 9/1982 | Croseck et al. ............. 425/412 |
| 4,726,412 A | | 2/1988 | Magnan et al. ............... 164/19 |
| 4,744,849 A | | 5/1988 | Michaud-Soret |
| 4,847,026 A | | 7/1989 | Jarboe et al. ............... 264/467 |
| 4,940,561 A | | 7/1990 | Fritz |
| 4,941,212 A | | 7/1990 | Liff ............................. 2/206 |
| 5,213,747 A | | 5/1993 | Lippert ...................... 264/226 |
| 5,260,014 A | | 11/1993 | Holton et al. |
| 5,358,211 A | | 10/1994 | Sterett ......................... 249/80 |
| 5,437,547 A | * | 8/1995 | Holton et al. ................. 249/80 |
| 5,514,320 A | | 5/1996 | Bright ........................ 264/226 |
| 5,562,846 A | | 10/1996 | McKeen |
| 5,667,747 A | * | 9/1997 | Harding et al. ............. 264/510 |

* cited by examiner

Primary Examiner—James P. Mackey
Assistant Examiner—Donald Heckenberg
(74) Attorney, Agent, or Firm—Young & Basile, P.C.

(57) ABSTRACT

A method for preparing a mold form includes forming a mold blank having a surface corresponding to the surface of the article desired and enclosing the mold blank in an open ended enclosure. A thin layer of polymer resin, preferably polyurea is sprayed on the surface of the mold blank and allowed to cure. Heat transfer tubing is inserted over the resin layer. A mixture of metallic pellets and epoxy are inserted over the heat transfer tubing and then another layer of resin is sprayed over the mixture. After the resin has cured, the mold blank is removed to expose the mold form having an outer surface of polyurea.

15 Claims, 3 Drawing Sheets

THERMAL COOLED VACUUM FORM

RELATED APPLICATION

This application is a divisional application of co-pending U.S. patent application Ser. No. 09/211,957, filed Dec. 15, 1999.

The present invention generally relates to the manufacture of molded parts and in particular a thermal cooled mold form.

BACKGROUND OF THE INVENTION

Conventionally, mold forms are manufactured from such materials as aluminum, steel or wood. In the case of steel and aluminum, expensive casting or cutting machinery is required for producing the final formed shape. After the design is formed, the mold requires hand finishing to finalize certain complex features of the mold. Further, cooling passages must then be installed into the steel or aluminum to provide means for maintaining the mold within a certain temperature range during its use. As a result, a large or complicated mold may require many weeks to complete. Although steel or aluminum molds provide a high quality mold form, the life use of these types of molds may exceed the life of the final product production. Therefore, in many cases a steel or aluminum mold is very expensive relative to the benefits of the final molded piece.

Wood molds are undeniably cheaper than the aforementioned steel or aluminum molds, but still requires a labor intensive manufacturing procedure to produce a quality mold. A wood mold involves no cooling system, thereby causing excessive press time in the manufacturing process. Wood tools, without a cooling system, causes unpredictable shrinkage in the manufactured part. The durability of wood tools is very short.

It is therefore desirable to provide a mold and a method for constructing the mold which can be manufactured quickly, and at less cost to the manufacturer without measurably affecting durability.

SUMMARY OF THE INVENTION

The present invention addresses the aforementioned concerns by providing a mold having a mold surface made of a polymer resin, in particular polyurea or a polyurea blend, polyurethanes or a polyurethane blend. The procedure to manufacture the mold piece includes forming a wax or wood pattern having a surface of the shape of the final molded piece, and then building a box structure around the wax or wood pattern. The wax or wood pattern is then sprayed with a polyurea or polyurethane material to completely coat the surface of the wax or wood structure. Cooling lines are placed within the box structure. After the polyurea or polyurethane material has dried/cured, aluminum puffs/pellets and an epoxy material mix is then inserted into the cavities of the mold. Mold support structures and stanchions may be placed within the box to provide strength and stability to the polyurea or polyurethanes mold as well as to provide additional heat transfer material to the mold. Another layer of polyureas or polyurethanes may be sprayed within the mold. After drying/curing, a vacuum plate is placed over the box structure providing exterior connections to the cooling lines as well as connections to the vacuum hole. The original wax or wood structure is then removed leaving a smooth mold surface made out of the polyurea or polyurethane material and/or blends.

The resulting mold and its process provides a quick, inexpensive and durable mold. Cooling lines are easily installed and eliminate the need of machining into steel or aluminum. Vacuum holes are able to be drilled throughout the mold at a much faster rate than into steel or aluminum. The support structures provide a heat transfer element during the molding process in addition to providing support to the mold structure.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 7:
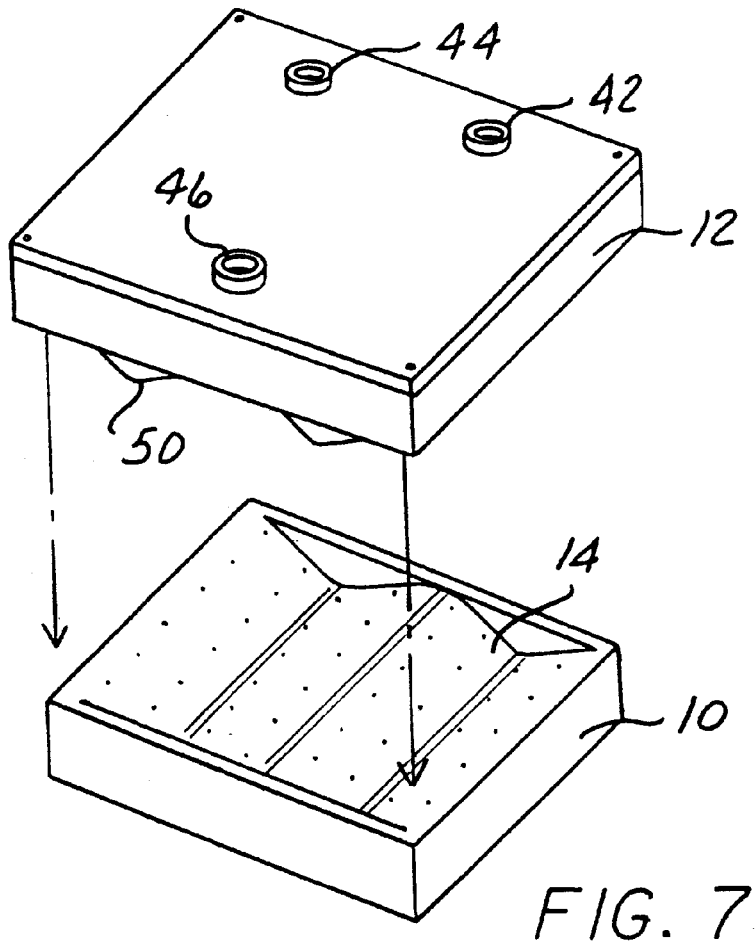
FIG. 7 is a perspective view showing the mold being removed from the wax or wood form.
Figure 8:
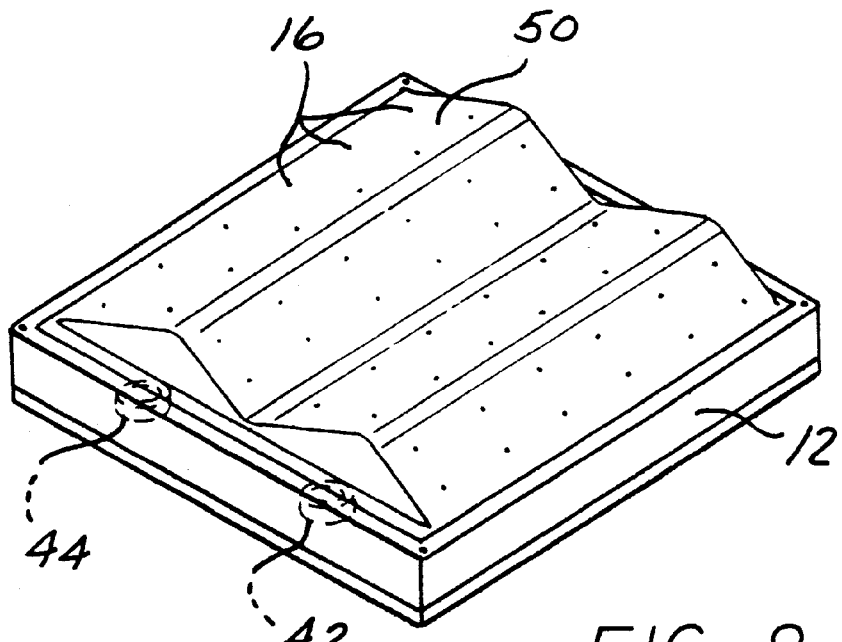
FIG. 8 is a perspective view showing a completed mold piece.

The intent of the invention is to provide a mold as shown in FIG. 8 for use at a manufacturing facility. The steps to provide the finished mold are shown in FIGS. 1–7.

According to one aspect of the invention, the characteristics of the final molded product are stored in a computer. A positive pattern or a mold blank 10 is made based on these characteristics of the finished molded product. These characteristics are retrieved to shape a positive pattern mold blank 10 from a wax or wood block. A box structure 12 is built around the positive mold blank 10 made of wax or wood material such that the positive surface represented as 14 is oriented face up in the interior of the box structure 12. After the box structure 12 is built, the preferred step is to spray the interior positive surface 14 with the polyurea or other predetermined material. But as an alternative, the positive pattern surface 14 can be prepped for providing vacuum holes to the final mold product before the positive surface 14 is sprayed. That step is described hereinafter.

Figure 3:
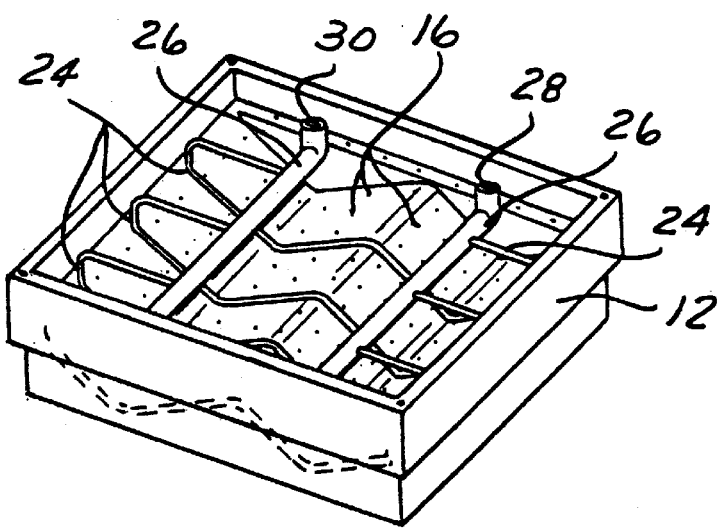
FIG. 3 is a perspective view showing cooling lines installed over the polyurea or polyurethane material.
Figure 4:
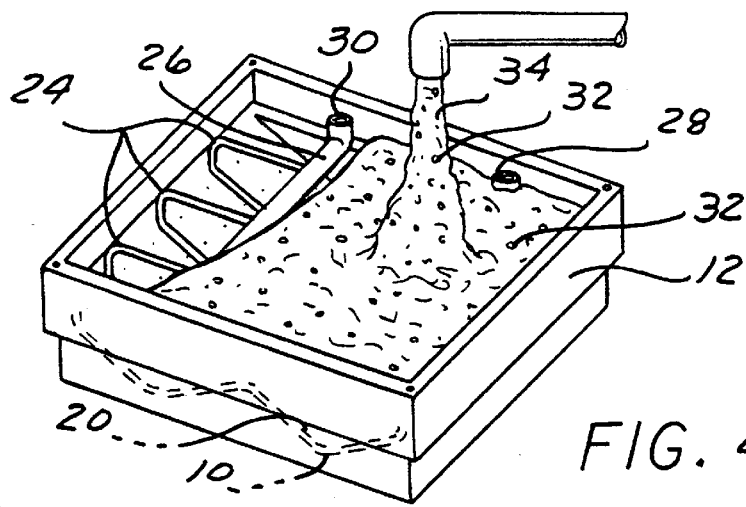
FIG. 4 is a perspective view showing a heat transfer and support material being deposited over the cooling lines.
Figure 5:
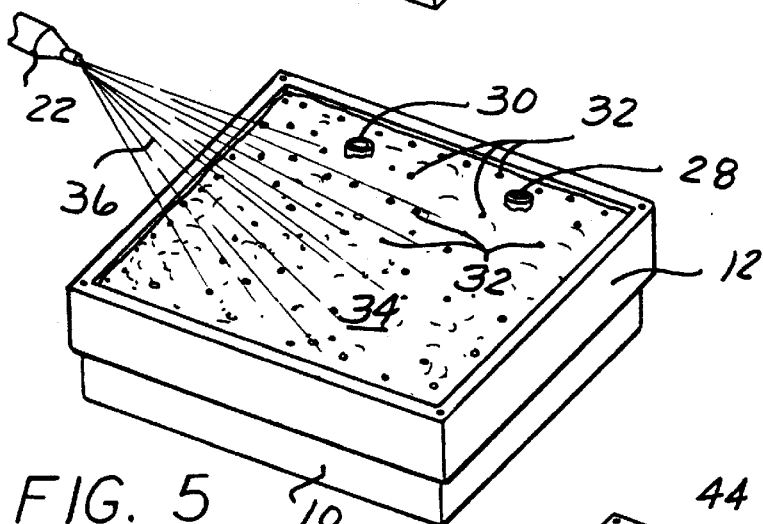
FIG. 5 is a perspective view showing another polyurea or polyurethane layer being deposited into the box structure.

As can be seen in FIGS. 3 and 8, vacuum holes 16 are drilled or otherwise disbursed into the positive surface 14 of the mold blank 10. The vacuum holes 16 are very small, approximately 0.040 inches diameter. The holes 16 are drilled into the positive surface 14 of the mold blank 10 such that wires 18 may be partially inserted into the holes 16 and extend upwardly into the interior of the box structure 12, above the positive surface 14 of the mold blank 10.

Figure 1:
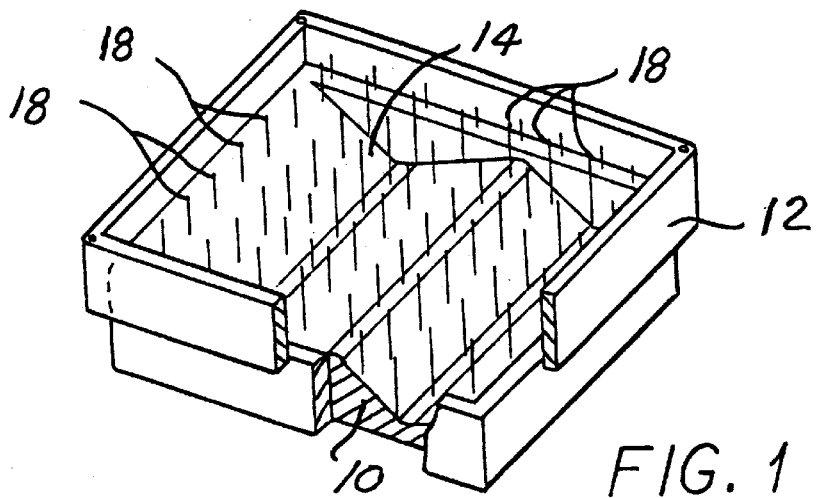
FIG. 1 is a perspective view of a wax pattern or form contained in a box structure.
Figure 2:
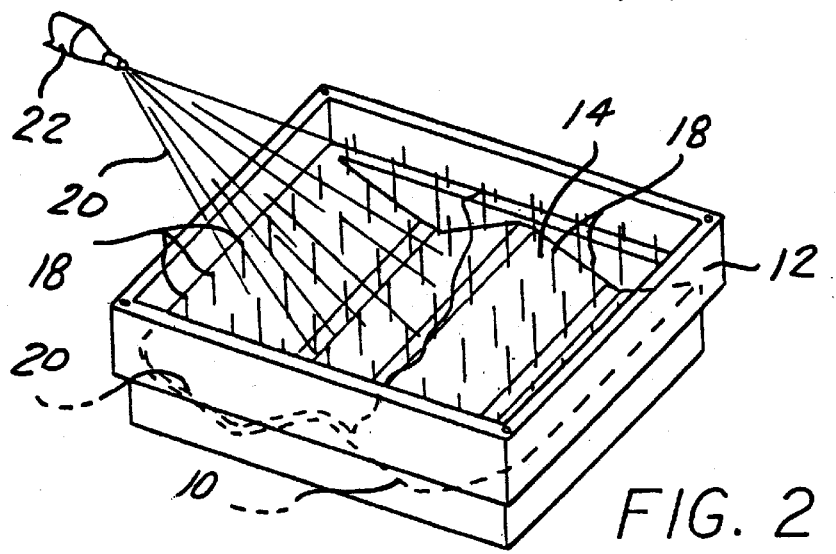
FIG. 2 is a perspective view showing a polyurea or polyurethane layer being deposited on the wax pattern.

In FIG. 2, the interior positive surface 14 of the wax pattern is sprayed with preferably a polyurea material 20. The material may be applied manually or by a robot 22.

Similar material such as a polyurea blend, polyurethane, or a polyurethane or urethane blend may be used. One of the advantages of using polyurea and the other mentioned materials is that the material provides a relatively quick cure time. That is after spraying, the material is dried within 20–30 seconds. Polyurea provides the quickest drying time and the best durability of the aforementioned materials. Further, these materials, and especially polyurea, provide excellent impact strength, stability at high temperature, and surface quality. The spray polyurea or polyurethane material 20 may be tinted to a color such that when the material is manually sprayed onto the wax pattern 10, the operating personnel knows when the entire positive surface 14 has been covered with the material 20. The polyurea or polyurethane material 20 is applied as thin as possible, less than one-eighth inch thick and preferably approximately 0.060 inches thick. FIG. 2 shows the positive surface 14 partially covered by the polyurea material 20.

The polyurea material 20 dries within a half a minute so that cooling lines or tubes (heat transfer tubing) 24 may be installed soon after the polyurea material 20 is applied. FIG. 3 shows the cooling lines 24 installed within the box structure 12 over the first polyurea layer 20 and mold blank 10. The cooling lines 24 are installed according to the shape of the mold blank 10. The cooling lines 24 are preferably made out of the copper tubing that meet in a pair of manifolds 26 providing an inlet 28 and outlet 30 aperture for later connection to an outside cooling source. The size and configuration of the cooling lines 24 will depend on the mold size and cooling or heating requirements.

In addition to the cooling tubing 24, metal pellets 32 such as aluminum can be disposed within the box structure 12. Aluminum pellets 32 are preferred because of their light weight and high heat transfer capabilities. The metal pellets or chips 32 are first mixed with an epoxy material 34 to provide some adhesion to the metal pellets 32 and prevent them from freely moving within the box structure 12. Looking a FIG. 4, the metal pellets 32 and epoxy material 34 can be poured or otherwise disposed into the box structure 12 over the cooling tubes 24 such that the cooling tubes 24 are virtually covered with the pellets 32 and epoxy 34 mixture. The metal pellets 32 and epoxy 34 mixture provides added strength to the final mold, plus provides an additional form of heat transfer. Although the cooling tubes 24 are virtually covered by th metal pellet 32 and epoxy 34 mixture, the inlet an outlet apertures 28, 30 respectively of the manifolds 26 remain exposed so that they may be later operatively connected to fluid lines. The metal pellet 32 and epoxy 34 mixture does not provide an impenetrable mixture and therefore many air hole passages are available between the pellets 32 within the mixture. This allows for the vacuum draw to reach the vacuum holes 16 in the first layer of polyurea through the metal pellet 32 and epoxy 34 mixture.

After the pellet and epoxy mixture is applied, the epoxy 34 is allowed to solidify. Looking at FIG. 5, it is shown that another layer 36 of polyurea or polyurethane material may be sprayed over the cooling lines 24 and metal pellet 32 and epoxy 34 mixture. Again, the second layer of polyurea 36 or other similar material, as stated above, may be applied thinly over the cooling lines 24 and metal pellet and epoxy mixture. The second layer of polyurea material 36 may also be tinted to indicate that the entire surface has been covered with the polyurea material 36.

Figure 6:
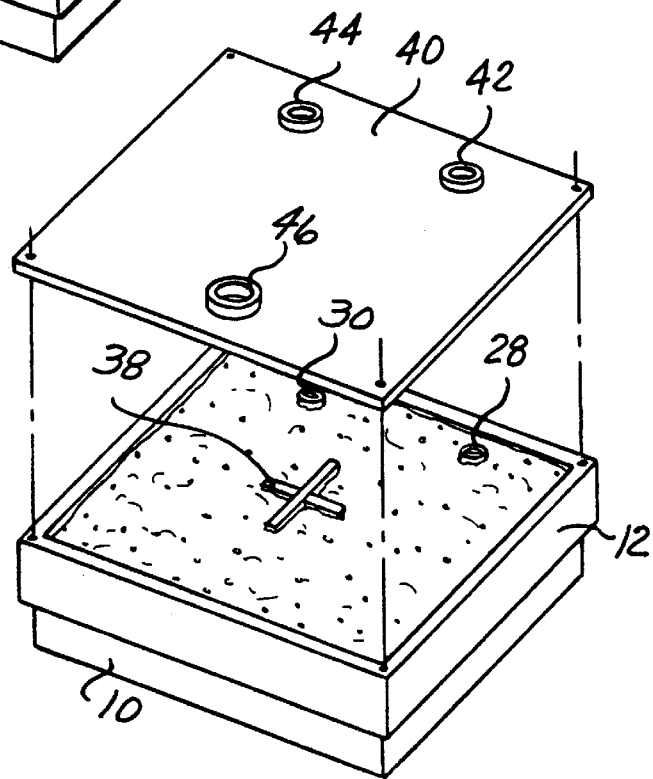
FIG. 6 is a perspective view showing a covered plate being installed over the box structure.

As shown in FIG. 6 further supports or stanchions 38 may be inserted into the box structure 12 to provide added strength to the final mold. A vacuum plate or closure top 40 is then inserted and sealed over the box structure 12. The vacuum plate 40 has apertures 42, 44 corresponding to the inlet 28 and outlet 30 apertures of the heat transfer manifolds 26. Further there is a third aperture 46 for accessing a vacuum source to the interior of the box structure 12.

Generally, after the plate 40 is sealed onto the box structure 12, the mold blank 10 and wires 18 providing vacuum holes 16, if applicable, to the polyurea layers 20, 36 may be removed as shown in FIG. 7. The mold blank 10 and wires 18 can be discarded or used again. The box structure 12 in FIG. 7 is turned over 180° to expose the final mold 50 as shown in FIG. 8. The fluid apertures 42, 44 and 46 are positioned at the bottom of the box structure 12 for later connection. If vacuum holes 16 were not provided in the polyurea surface 20 via the wires 18 during the manufacture of the mold, the final mold 50 may be drilled once the mold blank 10 is removed. The drilled vacuum holes 16 are very small, preferably approximately 0.040 inches diameter. Drilling the vacuum holes 16 after the final mold 50 is completed is the preferred method. Drilling the vacuum holes 16 at the end saves steps plus eliminates the need of the wires 18.

The resultant mold 50 provides a cost effective mold that can be manufactured quickly, with a minimum of labor and material expenditures. The resultant mold 50 manufactured by the process as detailed above can be available for use within a couple of days.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A mold form for an article comprising:
   a porous layer of plastic resin having an article-forming surface and a second surface opposite from the article-forming surface, the plastic resin selected from the group consisting of polyureas, polyurea blends, polyurethanes, polyurethane blends, and mixtures thereof;
   heat transfer tubing positioned adjacent the second surface;
   a porous mixture of metal pellets and epoxy positioned adjacent to the second surface and between the heat transfer tubing permitting vacuum communication through the porous mixture and layer during vacuum forming of the article to be manufactured; and
   a second layer selected from the group consisting of polyureas, polyurea blends, polyurethanes, polyurethane blends, and mixtures thereof, wherein said second layer substantially covers the porous mixture.

2. The mold form of claim 1 further comprising an enclosure having at least one surface with apertures accommodating entry and exit of the heat transfer tubing.

3. The mold form of claim 2, wherein the article-forming surface has small vacuum apertures formed therein, and the at least one surface includes an aperture adapted to communicate with a vacuum source.

4. A mold form for an article comprising:
   a layer of cured plastic resin having an article-forming surface corresponding to a surface of the article to be manufactured and a second surface opposite from the article-forming surface, the layer of cured plastic resin having a plurality of small vacuum apertures formed in and extending therethrough allowing passage of vacuum during vacuum forming of the article to be manufactured; and heat transfer tubing positioned adjacent to the second surface of the layer of cured plastic resin, wherein the thickness of the layer of cured plastic resin is less than one-eighth inch thick.

5. The mold form of claim 4 wherein the layer of cured plastic resin is selected from the group consisting of polyureas, polyurea blends, polyurethanes, urethane blends, and polyurethane blends.

6. A mold form for an article comprising:

a layer of cured plastic resin having an article-forming surface corresponding to a surface of the article to be manufactured and a second surface opposite from the article-forming surface, the layer of cured plastic resin having a plurality of small vacuum apertures formed in and extending therethrough allowing passage of vacuum during vacuum forming of the article to be manufactured;

heat transfer tubing positioned adjacent to the second surface of the layer of cured plastic resin; and a porous layer including a porous mixture of metal pellets and epoxy positioned between the heat transfer tubing and adjacent to the second surface allowing communication between the source of vacuum and the article-forming surface wherein the layer of cured plastic resin is a first layer, and further comprising a second layer of cured plastic resin spaced from the first layer of cured plastic resin with the porous layer including the porous mixture of metal pellets and epoxy interposed therebetween.

7. The mold form of claim 6, wherein the metal pellets are formed from aluminum.

8. The mold form of claim 6 further comprising the first and second layers of cured plastic resin selected from the group consisting of polyureas, polyurea blends, polyurethane, polyurethane blends, and mixtures thereof.

9. The mold form of claim 4, wherein the heat transfer tubing is formed from copper.

10. A mold form for an article comprising:

a layer of cured plastic resin defining an article-forming surface for vacuum forming an article to be manufactured and a second surface opposite from the article-forming surface;

heat transfer tubing positioned adjacent to the second surface of the layer of cured plastic resin;

a layer containing a porous mixture of metal pellets and epoxy positioned between the heat transfer tubing and adjacent to the second surface of the layer of cured plastic resin; and vacuum passage means, formed in and extending through the layer of cured plastic resin and the layer containing the porous mixture of metal pellets and epoxy, for drawing vacuum therethrough while vacuum forming the article to be manufactured, wherein the layer of cured plastic resin is a first coat, and further comprising a second layer of cured plastic resin applied over the layer containing the mixture of metal pellets and epoxy.

11. The mold form of claim 10, wherein the layer of cured plastic resin is selected from the group consisting of polyureas, polyurea blends, polyurethanes, urethane blends, and polyurethane blends.

12. The mold form of claim 10, wherein the heat transfer tubing is formed from copper.

13. The mold form of claim 10, wherein the metal pellets are formed from aluminum.

14. The mold form of claim 10, wherein the second layer of resin is selected from the group consisting of polyureas, polyurea blends, polyurethanes, urethane blends, and polyurethane blends.

15. The mold form of claim 10 wherein the thickness of the first and second coats of resin is less than one-eight inch thick.

\* \* \* \* \*